US011300682B2

(12) United States Patent
Bennett et al.

(10) Patent No.: US 11,300,682 B2
(45) Date of Patent: Apr. 12, 2022

(54) MULTI-STATIC AND BISTATIC COHERENT LIDAR WITH LASERS LOCKED TO A REFERENCE

(71) Applicant: BAE SYSTEMS Information and Electronic Systems Integration Inc., Nashua, NH (US)

(72) Inventors: Aaron W. Bennett, Merrimack, NH (US); Murray R. Collette, Temple, NH (US); Brant M. Kaylor, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 90 days.

(21) Appl. No.: 16/163,675

(22) Filed: Oct. 18, 2018

(65) Prior Publication Data

US 2020/0124728 A1    Apr. 23, 2020

(51) Int. Cl.
| | |
|---|---|
| *G01S 17/32* | (2020.01) |
| *G01N 21/31* | (2006.01) |
| *G01N 21/3504* | (2014.01) |
| *G01N 23/203* | (2006.01) |
| *G01S 17/88* | (2006.01) |
| *G01V 5/00* | (2006.01) |

(52) U.S. Cl.
CPC ............ *G01S 17/32* (2013.01); *G01N 21/314* (2013.01); *G01N 21/3504* (2013.01); *G01N 23/203* (2013.01); *G01S 17/88* (2013.01); *G01V 5/0025* (2013.01)

(58) Field of Classification Search
CPC ........ G01S 17/003; G01S 17/32; G01S 17/88; G01V 5/0025; G01N 21/314; G01N 21/3504
See application file for complete search history.

(56) References Cited

U.S. PATENT DOCUMENTS

| | | | | |
|---|---|---|---|---|
| 5,750,986 A | * | 5/1998 | Genovese | .............. H04N 1/053 250/235 |
| 7,397,568 B2 | | 7/2008 | Bryce et al. | |
| 7,777,866 B1 | * | 8/2010 | Kyrazis | ................... G01P 3/366 356/28.5 |

(Continued)

OTHER PUBLICATIONS

L.A. Jiang et al., "Laser vibrometry from a moving ground vehicle", Applied Optics, vol. 50, No. 15, pp. 2263-2273; May 20, 2011.

(Continued)

*Primary Examiner* — Violeta A Prieto
(74) *Attorney, Agent, or Firm* — KPIP Law, PLLC; Scott J. Asmus

(57) ABSTRACT

A system and method for a bistatic coherent LIDAR system with lasers locked to a reference. Utilizing atomic absorption lines to lock the frequency for the bistatic system provides an absolute reference, as each of the lasers in the bistatic system would have the same frequency to within the linewidth of the frequency reference. Each laser may also be additionally locked to an optical cavity for increased frequency stability. Not only does such a system provide essentially an infinite aperture, it also reduces laser power requirements because the detector platforms could be much closer to the target than the platform that contains the laser.

9 Claims, 4 Drawing Sheets

(56) References Cited

U.S. PATENT DOCUMENTS

| | | | |
|---|---|---|---|
| 8,159,736 B2* | 4/2012 | Maleki | H04B 10/5165 |
| | | | 359/239 |
| 8,780,948 B2* | 7/2014 | Wilkinson | H01S 3/0057 |
| | | | 372/32 |
| 8,995,796 B2* | 3/2015 | Holzwarth | G02B 6/26 |
| | | | 385/11 |
| 9,440,289 B1 | 9/2016 | Spariosu et al. | |
| 9,702,975 B2 | 7/2017 | Brinkmeyer et al. | |
| 10,637,585 B1* | 4/2020 | Bennett | H04B 10/85 |
| 10,802,120 B1* | 10/2020 | LaChapelle | G01S 7/4818 |
| 2004/0109217 A1* | 6/2004 | Maleki | G04G 7/00 |
| | | | 359/239 |
| 2007/0263681 A1* | 11/2007 | Yoshitomi | H01S 3/10092 |
| | | | 372/25 |
| 2009/0289728 A1* | 11/2009 | Ben-Aroya | G04F 5/145 |
| | | | 331/94.1 |
| 2010/0118375 A1* | 5/2010 | Maleki | G02F 1/0353 |
| | | | 359/239 |
| 2014/0160458 A1* | 6/2014 | Halmos | G01S 17/003 |
| | | | 356/4.01 |
| 2019/0181611 A1* | 6/2019 | Maleki | H01S 3/1392 |
| 2021/0080324 A1* | 3/2021 | Rieker | G01J 3/0218 |

OTHER PUBLICATIONS

R.W.P. Drever et al., "Laser Phase and Frequency Stabilization Using an Optical Resonator", Applied Physics B 31, pp. 97-105; 1983.

N. Ashby, "Confidence Estimates in Simulation of Phase Noise or Spectral Density", IEEE Transactions on Ultrasonics, Ferroelectrics and Frequency Control, May 2017, pp. 872-878, vol. 64, No. 5.

N. Ashby, "Discrete Simulation of Power Law Noise", 44th Annual Precise Time and Time Interval (PTTI) Systems and Applications Meeting, pp. 289-300, National Institute of Standards and Technology, Boulder, CO 80305 USA.

* cited by examiner

MULTI-STATIC AND BISTATIC COHERENT LIDAR WITH LASERS LOCKED TO A REFERENCE

FIELD OF THE DISCLOSURE

The present disclosure relates to LIDAR and more particularly to bistatic and multi-static coherent LIDAR which is enabled by locking the lasers to a reference.

BACKGROUND OF THE DISCLOSURE

LIDAR (also referred to as LADAR and laser radar) is a method of remote sensing by illuminating a target with laser light and measuring the reflected or backscattered illumination with some form of sensor. Common applications of LIDAR include 3D mapping, using pulsed lasers to measure distance, and gas sensing, using changes in the backscattered laser intensity.

LIDAR uses ultraviolet, visible, or infrared light to observe objects. The LIDAR method can observe a wide range of materials, including solid objects, rain, wind, chemical compounds, aerosols, clouds and even single molecules. In some cases, a narrow laser beam can map physical features of an object with very high resolution; for example, an airborne LIDAR sensor can map terrain at 30 cm (i.e., 12 in) resolution or better.

Wavelengths used in LIDAR system vary to suit the object of interest: from the long-wave infrared band (approximately 10,000 nm) to the ultraviolet band (approximately 250 nm). In some cases, combinations of wavelengths can allow for remote mapping of atmospheric constituents by identifying wavelength-dependent changes in the intensity of the returned signal.

The two kinds of LIDAR detection schemes are incoherent or direct detection (which principally measures intensity changes of the reflected light) and coherent detection. In physics, two wave sources are perfectly coherent if they have a constant phase difference for all time. Coherence is a property of waves that enables interference, which can be observed either spatially or temporally. Coherent systems use interference (generally optical heterodyne detection) and are best for measuring changes in the frequency and phase of the reflected light, e.g., Doppler shifts and vibrations. As such, coherent systems must provide or maintain a second laser beam to act as a phase reference for the interference measurement. This is referred to as a reference beam. Coherent systems can be more sensitive than direct detection, but coherent systems generally require more complex transmitters and receivers.

It is understood that when interfering, two waves can add together to create a wave of greater amplitude than either one (constructive interference) or subtract from each other to create a wave of lesser amplitude than either one (destructive interference), depending on their relative phase. Two waves are said to be coherent if they have a constant relative phase. The amount of coherence can readily be measured by the interference visibility, which looks at the size of the interference fringes relative to the input waves (as the phase offset is varied); a precise mathematical definition of the degree of coherence is given by means of correlation functions.

Spatial coherence describes the correlation (or deterministic relationship) between waves at different points in space, either lateral or longitudinal. Temporal coherence describes the correlation between waves observed at different moments in time. An example of spatial coherence in LIDAR would be maintaining a narrow beam even at large distances. An example of temporal coherence in LIDAR would be a beam of a narrow frequency range, or the like.

LIDAR systems can also be monostatic, wherein the receiver and transmitter use the same optical aperture or bistatic or multi-static, where separate apertures are used. Frequently, quasi-monostatic systems are built, in which separate but collocated apertures are used, and the lasers and electronics are shared. Truly bistatic systems are those where the receiver and transmitter are not collocated and share no common equipment. This set-up presents numerous challenges, but is often desirable for performance reasons as well as size, weight and power limitations. The primary challenge in truly bistatic and multi-static systems is time synchronization between receiver(s) and the transmitter and, for coherent systems, generating or maintaining coherence between the receiver(s) and the transmitter. A multi-static system is an extension of bi-static system where there are multiple receivers at different locations and only a single transmitter.

Wherefore it is an object of the present disclosure to overcome the above-mentioned challenges associated with truly bistatic LIDAR systems.

SUMMARY OF THE DISCLOSURE

One aspect of the present disclosure is a multi-static or bistatic LIDAR system, comprising: a transmitter laser source for transmitting a transmitted laser signal for use in observing one or more objects; one or more receiver laser sources one per receiver on one or more receivers, where the one or more receiver laser sources provide a reference beam in order to create an interference or heterodyne signal; one or more detectors one per receiver on the one or more receivers being configured to detect the transmitted laser signal and the interference between the transmitted laser signal and the reference beam for use in observing the one or more objects, wherein the transmitter laser source and the one or more receivers a located a distance apart from each other thereby forming a bistatic or multi-static system; and a control system for maintaining coherence for each laser such that the transmitter laser and each receiver laser locks at the same frequency reference.

One embodiment of the multi-static or bistatic LIDAR system is wherein the frequency reference is an atomic reference frequency lock. In some cases, the frequency reference is a temperature stabilized cavity.

Another embodiment of the multi-static or bistatic LIDAR system is wherein the atomic reference frequency is that of the Rb transition at 780 nm.

Another aspect of the present disclosure is a method of reference locking a multi-static or bistatic coherent LIDAR system, comprising: transmitting, via a transmitter laser source, a transmitted laser signal for use in observing one or more objects; providing one or more receiver laser sources one per receiver on one or more receivers, transmitting, via each of the receiver laser sources, a reference beam in order to create an interference or heterodyne signal; detecting, via one or more detectors one per receiver on the one or more receivers wherein the detectors are configured to detect the transmitted laser signal and the interference between the transmitted laser signal and the reference beam for use in observing the one or more objects, and wherein the transmitter laser source and the one or more receivers are located a distance apart from each other thereby forming a bistatic or multi-static system; and maintaining coherence for each laser, via a control system, such that the transmitter laser and each receiver laser locks at the same frequency reference.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1A:
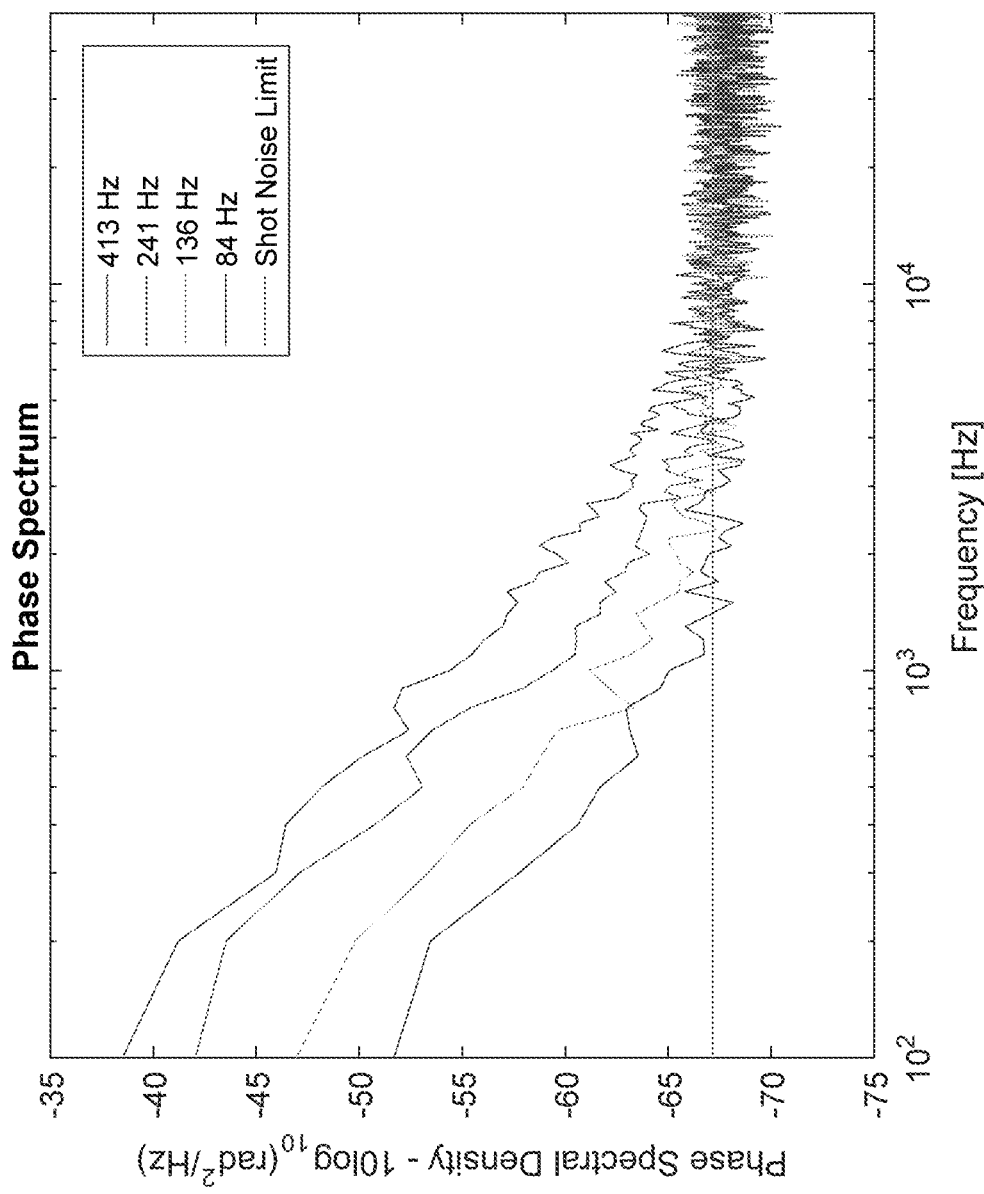
FIG. 1A shows the impact of laser linewidth on the phase noise spectral density according to the principles of the present disclosure.

The coherence of a laser can be quantified by characterizing its phase noise. Coherence is also often quantified by the laser linewidth, which is a related quantity, or the coherence time, which is the reciprocal of the linewidth. Depending on the types of noise present, the linewidth may be inadequate or worse—not even measurable. Phase noise measurements, and therefore coherence measurements, are always performed relative to a second laser. Frequently, two identical, independently operating lasers are used with the assumption that they contribute an equal amount of phase noise. The power spectral density of the phase noise, $S_\phi(f)$, provides the most complete characterization. The integrated phase noise (with associated limits of integration) is also frequently used.

One definition of laser linewidth $\Delta v$ is related to the integrated phase noise by:

$$\Delta v = \sqrt{\int f^2 S_\phi(f) df}$$

This gives a relationship between phase noise, linewidth, and coherence time.

For a coherent, monostatic system, the rule of thumb for coherence requirements is that the total time delay to propagate to the object and back is less than the coherence time of the laser. For a coherent bistatic or multi-static system, the coherence requirements are much stricter. Moreover, the propagation time delay is no longer relevant. In either case, the optimal performance of a coherent system is attained when the quality of the phase measurement is only limited by the signal-to-noise ratio (SNR). Some references refer to the carrier-to-noise ratio (CNR), which is a related quantity. As derived in the published literature (e.g. Jiang et al., Applied Optics, 2011), the precision of a phase measurement $\hat{\phi}$ for a given heterodyne SNR is:

$$\hat{\phi} \approx \frac{1}{\sqrt{SNR}}$$

The electric field E(t) associated with the laser illumination can be written as:

$$E(t) = A e^{-i(\omega t + \phi(t))}$$

where $\phi(t)$ is the laser phase noise.

A monostatic measurement can be considered a delayed self-heterodyne measurement of the laser field. This results in a photovoltage V(t) that is proportional to:

$$V(t) \propto |E(t-\tau)| = A^2 e^{-i(\omega \tau - \phi(t) + \phi(t-\tau))}$$

where $\tau$ is the time delay associated with the path length difference of the measurement or the round trip delay to the object or target.

In the case of a bistatic measurement, the resulting photovoltage can be written as:

$$V(t) \propto |E_1(t)^* E_2(t)| = A_1 A_2 e^{-i((\omega 2 - \omega 1)t + \phi 2(t) - \phi 1(t))}$$

where the subscript corresponds to the field of each laser. Notionally, we can consider the monostatic case to measure the correlation of the phase noise at a fixed time delay. In the bistatic case, the phase noise is measured directly, and assuming two identical lasers, we measure twice the amount of phase noise. In either case, this defines how phase noise is manifested in a coherent measurement. For the purposes of this analysis, the frequency of each laser is considered to be deterministic and the phase noise term can contribute a frequency shift when the derivative of the phase noise is non-zero. Laser phase noise can be expressed as a type of power law noise, with a power spectrum given as:

$$S_\phi(f) = h_\alpha f^\alpha, f > 0$$

where $\alpha$ defines the type of power law noise and the power coefficient $h_\alpha$ controls its strength.

The condition $\alpha = 0$ corresponds to white frequency or random walk phase noise and results in a Lorentzian laser line shape. The physical process that corresponds to random walk phase noise is spontaneous emission. The condition $\alpha = -2$ corresponds to random walk frequency noise and results in a Gaussian line shape. The physical process that corresponds to random walk frequency noise is cavity length variation. A laser will likely include both types of phase noise, each of which will dominate at different time scales. In one embodiment, coherence requirements are determined for a bistatic system in the presence of random walk phase noise because it tends to be the dominant noise source in lasers with good coherence.

The table below shows the results of a numerical simulation that characterizes the quality of a heterodyne measurement in the presence of laser phase noise.

Table 1 gives the required linewidth along with the integrated phase noise to achieve shot-noise-limited phase noise spectrum as a function of the signal-to-noise (SNR) ratio. In the simulation, the heterodyne signal was measured over 10 ms with a sample rate of 100 MSPS. The limits of integration for the integrated phase noise were 0 Hz to 50 kHz.

TABLE 1

Laser coherence requirements as a
function of SNR: selected values.

| SNR (dB) | Linewidth (Hz) | Integrated phase noise (rad$^2$) |
|---|---|---|
| 28.7 | 1690 | 0.670 |
| 33.1 | 924 | 0.245 |
| 36.7 | 532 | 0.106 |
| 42.4 | 295 | 2.87E−2 |
| 46.5 | 173 | 1.12E−2 |
| 54.2 | 99.3 | 1.90E−3 |
| 57.7 | 65.4 | 8.57E−4 |

Referring to FIG. 1A, the impact of laser linewidth on the phase noise spectral density is shown. For this simulation, the SNR was 50 dB. As noted before, the heterodyne signal was measured over 10 ms with a sample rate of 100 MSPS and the limits of integration for the integrated phase noise were 0 Hz to 50 kHz.

Even though the linewidth may be below that required to achieve shot-noise-limited performance, because the phase noise is not white, the laser phase noise may limit the system at some frequencies. This furthermore serves to illustrate why the power spectral density is the most complete representation of laser coherence as opposed to metrics such as linewidth or integrated phase noise.

It is understood that a monostatic LIDAR system has a transmitter and receiver that are colocated. The laser light from the transmitter is reflected back to, or backscattered off of, one or more objects and the colocated receiver detects the laser signal to determine information about the one or more objects. Traditional direct detect LIDAR systems are limited in their ability to acquire high resolution spatial and velocity information. One way to overcome these limitations is through coherent LIDAR. The light from a laser is said to be coherent if the wavelengths of the laser light are in phase in space and time. Current coherent LIDAR systems use a monostatic or quasi-monostatic configuration because then a single, highly coherent laser source can be used. While there is no inherent problem with monostatic systems, there can be significant benefits to bistatic or multi-static systems (e.g. link budget/size, weight and power limitations) but which present other challenges that must be addressed. Even when a system uses two very narrow linewidth lasers, if they are free-running at two different locations there is no guarantee that they will have the same frequency (or almost the same frequency) as needed to properly function.

In one embodiment of the present disclosure, a bistatic or multi-static system is used, where a single platform provides the transmitted laser light that one or more separate platforms, each with their own receiver, use for coherent detection. Not only does such a system potentially provide essentially an infinite aperture, it also reduces laser power requirements because the receiver platforms can be much closer to the target than the platform which contains the transmitting laser.

In one embodiment of the present disclosure, a LIDAR system located on a larger platform is used to illuminate one or more objects. The receivers can thus be much smaller because they do not require a laser. There are several benefits to this arrangement. The first is that the receivers can be located anywhere, including closer to illuminated objects, which results in an overall system benefit because more light reaches the receivers thereby improving signal to noise ratio. Second, by using a larger platform for the transmitter, the system can support a higher laser power, again improving the signal to noise ratio. Third, when multiple receivers are employed, additional signal to noise benefits are realized.

The primary difficulty in designing a coherent, bistatic or multi-static system is that each of the detector/receiver platforms needs a narrow linewidth with a fixed frequency difference relative to the narrow linewidth laser on the laser platform in order to be effective. This frequency difference needs to be small enough that a photodiode can detect the heterodyne signal between the returning detect light and the narrow linewidth laser on the detector platform without aliasing, or without misidentifying the signal frequency, thus introducing distortion or error. Additionally, the degree of coherence needs to be such that phase variations do not overcome the phase one is trying to measure. The coherence requirements are dictated by the system's signal to noise ratio as well as the types of phase noise present in the system. One possible requirement is that the phase errors be less than 1/sqrt(SNR), but even then a full evaluation of the power spectral density of the phase should be conducted.

In one embodiment of the present disclosure the narrow linewidth lasers on the transmitter and receiver platforms are locked to the same atomic absorption line. Because atomic absorption lines are an absolute reference, each of the lasers in the bistatic or multi-static system would be locked to the same frequency to within the linewidth of the frequency reference. Each laser may also be locked to an optical cavity for increased frequency stability. In simple terms, the transmission through an optical cavity is frequency dependent, thus providing a measurable signal to be stabilized.

Figure 1B:
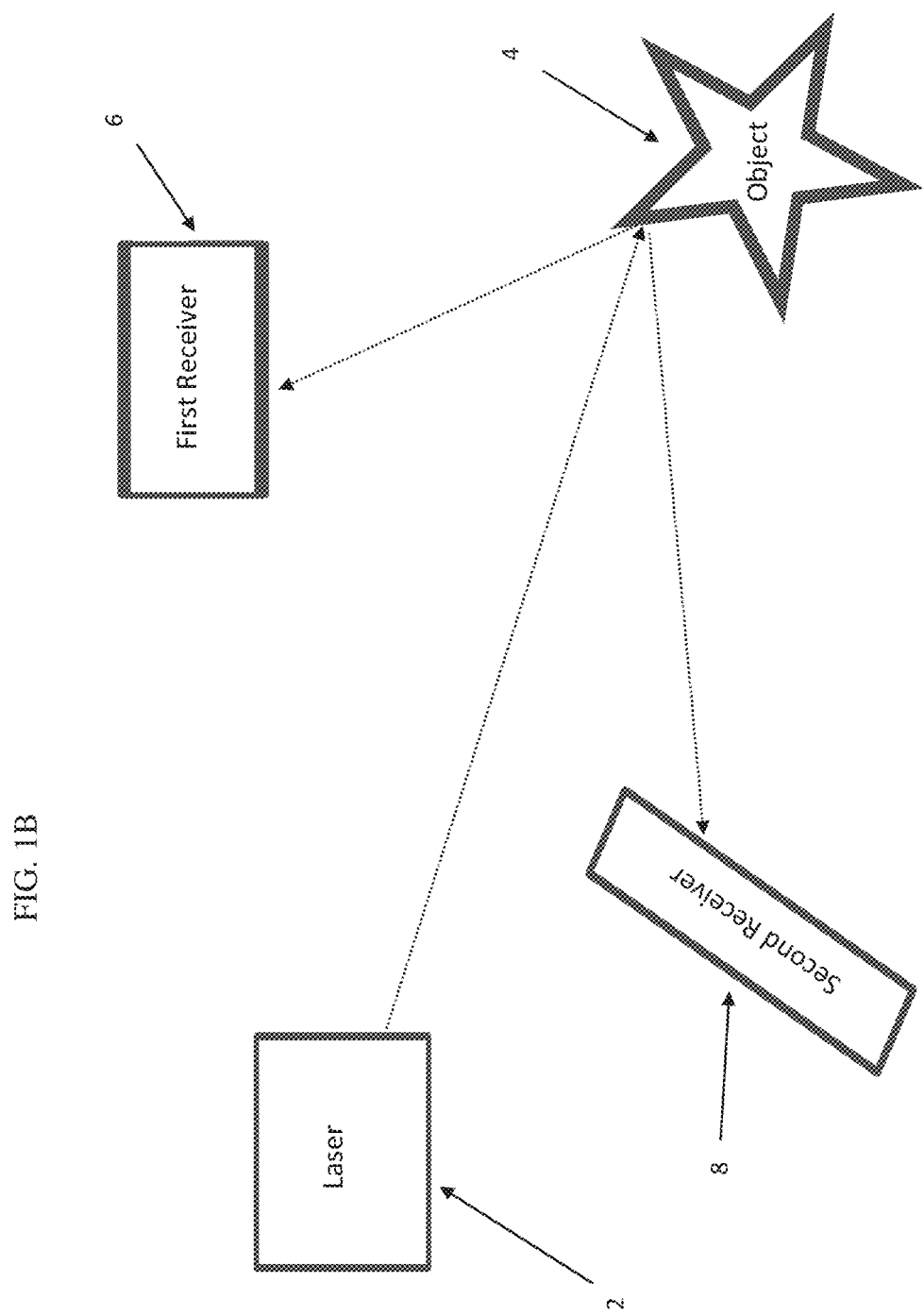
FIG. 1B is a diagrammatic view of a bistatic LIDAR system according to the principles of the present disclosure.

Referring to FIG. 1B, a diagrammatic view of a multi-static LIDAR system according to the principles of the present disclosure is shown. More specifically, in a multi-static system, a transmitting laser 2 is located some distance away from a first receiver 6 for the system, and some distance away from at least one other receiver 8 for the system. The multi-static system is used to sense at least one object 4. In some cases, the transmitter 2 is located outside of firing range of a target (e.g., the transmitter is located on an aircraft), while the one or more receivers are within firing range of the target (e.g., one of the receivers is located on a tank).

Still referring to FIG. 1B, in some cases the laser transmits at about 1560 nm. In certain embodiments, each platform (i.e., transmitting and receiving) has lasers that are doubled and locked to a 780 nm Rb transmission. In this embodiment, this wavelength band between 1530 nm and 1570 nm is used because both high performance lasers and detectors are readily available. Other commonly used wavelength bands could be between 850 nm to 900 nm, 1030 nm to 1064 nm and 515 nm to 532 nm, for the same reasons. Wavelength bands that are commonly avoided are those with very poor atmospheric transmission such as 1350 nm to 1500 nm, 1800 nm to 1950 nm, 2500 nm to 3000 nm and 5000 nm to 8000 nm, with the caveat that wavelength bands of moderate transmission can be beneficial for LIDAR gas and chemical sensing applications.

Figure 2:
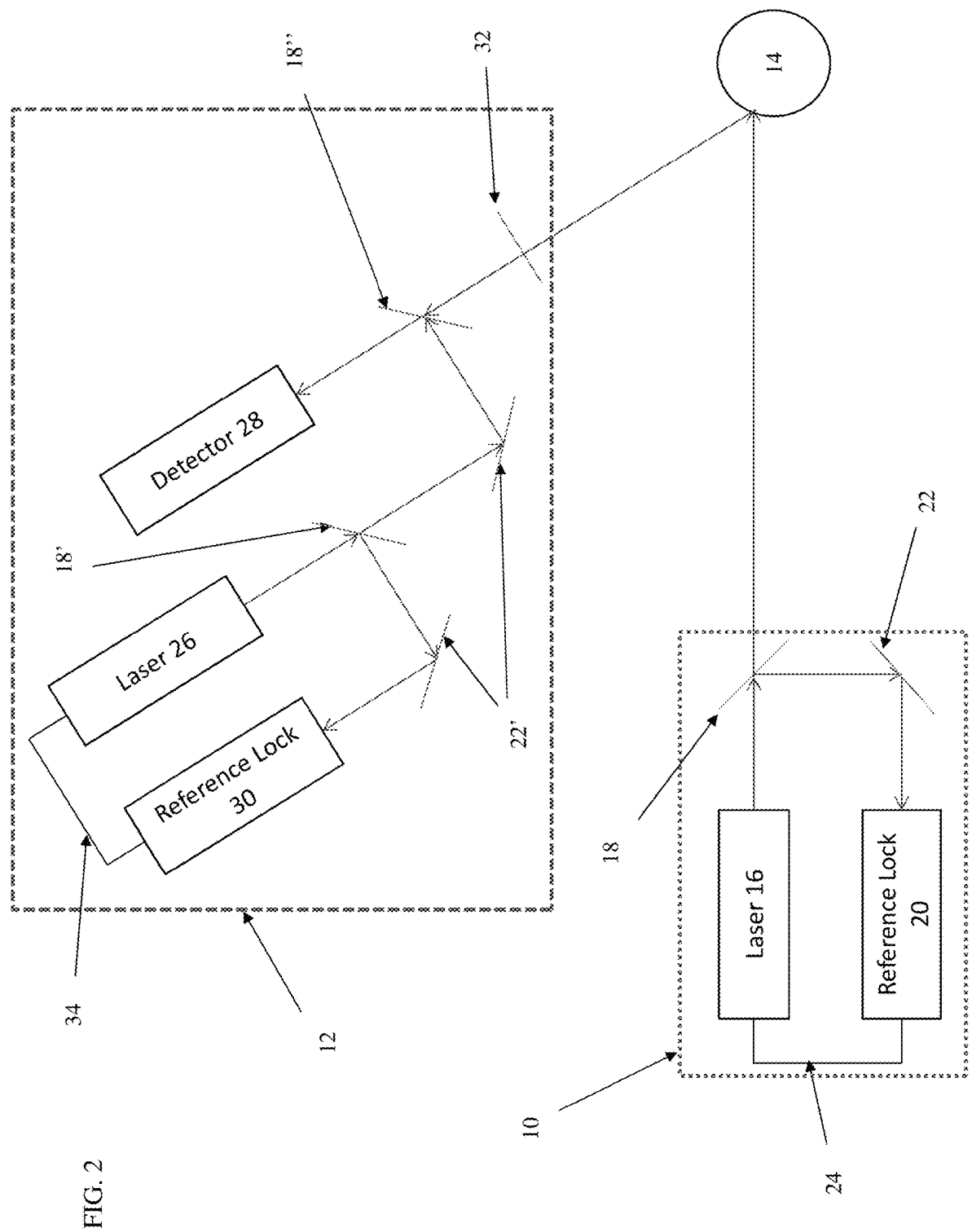
FIG. 2 is a diagrammatic view of one embodiment of a locked coherent bistatic LIDAR system of the present disclosure.

Referring to FIG. 2, a diagrammatic view of one embodiment of a locked coherent bistatic LIDAR system of the present disclosure is shown. More specifically, in one embodiment a transmitter 10 and a receiver 12 are located some distance apart from each other. The transmitter 10 is used to generate a laser signal that is reflected off of an object being observed 14 and then the laser signal is detected at one or more receivers (e.g., 12). In one embodiment, the transmitter comprises a laser 16. Most of the light from the transmitter laser 16 is directed to the object being observed 14. A beam splitter 18 redirects a portion of the transmitted beam to use to lock to the reference lock 20 after being directed by a mirror 22. An error signal 24 is used by the laser 16 to adjust its frequency to stay locked to the reference 20.

Still referring to FIG. 2, the single remote receiver 12 in a bistatic system or each receiver in a multi-static system comprises a laser 26. Most of the light from the receiver laser 26 is directed to a detector 28 for heterodyne mixing. The use of mirrors 22' and beam splitters 18', 18" are used to direct the light properly within the receiver 12. A bandpass filter 32 can be used to inhibit jamming of the system by other's attempting to saturate the receiver detector 28.

Just as in the transmitter, a beam splitter 18' redirects a portion of the receiver beam for use in locking to the reference 30. A second beam splitter 18" is used to combine the light scattered off the object 14 being observed and the receiver laser 26 light. Additionally, an error signal 34 is used by the receiver laser 26 to adjust its frequency to stay locked to the reference 30. This provides for a receiver laser 26 that is locked to the same frequency as the transmitter laser 16.

In one embodiment, a laser source is directed to an object and/or one or more detectors 28. Some portion of the laser signal is routed for use in a frequency lock. In certain embodiments, the laser source is at about 1560 nm and is directed through a doubling crystal to produce about 780 nm laser light. In some cases, the doubling crystal is a periodically poled lithium niobate (PPLN) crystal.

In one embodiment, cavity locking is used. There are many examples of locking to an optical cavity in the published literature, e.g. the seminal work by Dreyer et al., now commonly referred to as the Pound-Drever-Hall technique. The benefit of this technique is that it is independent of the laser intensity, thus decoupling the frequency control from any intensity variations.

Figure 3:
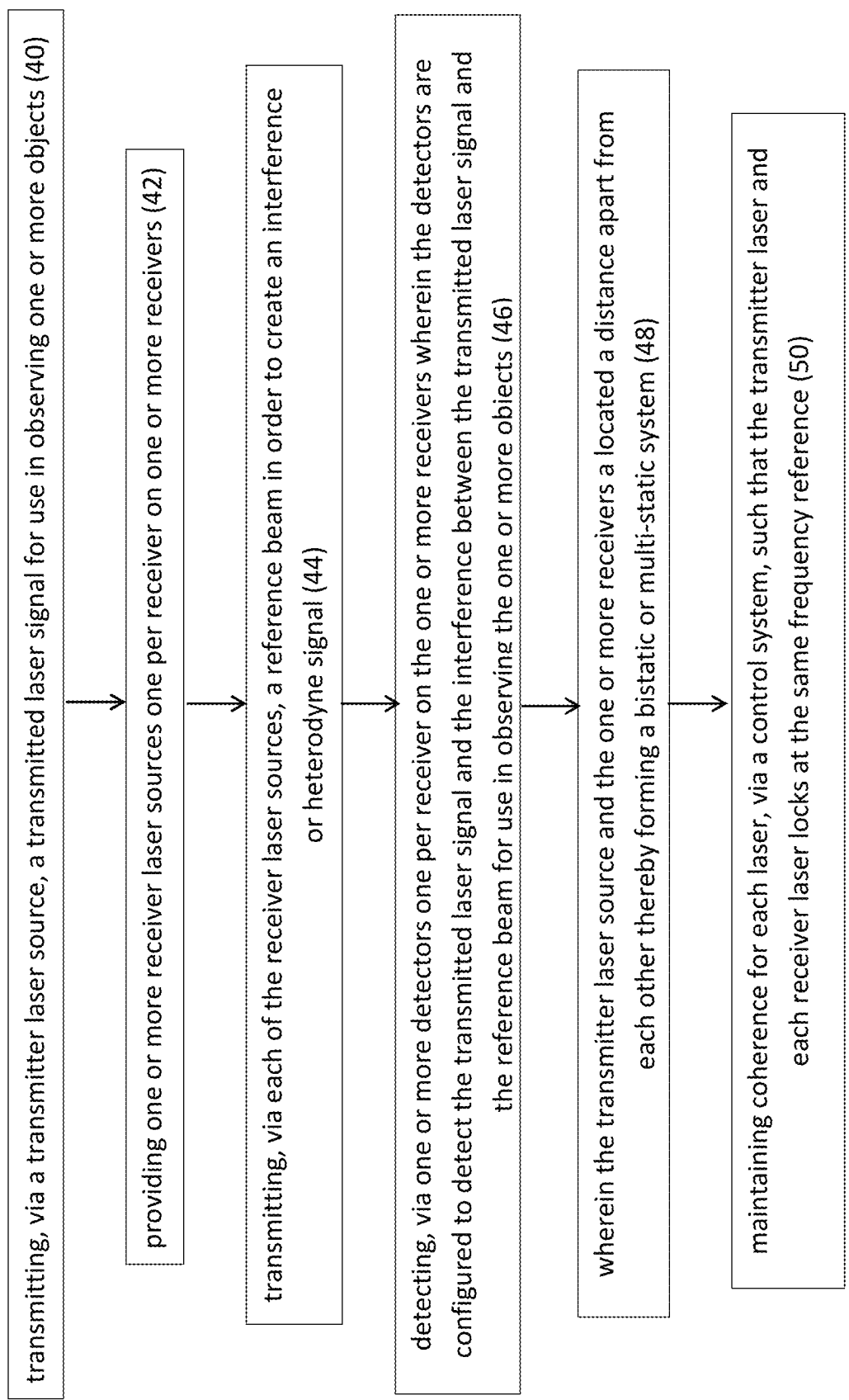
FIG. 3 shows one embodiment of a method according to the principles of the present disclosure.

Referring to FIG. 3, one embodiment of a method according to the principles of the present disclosure is shown. More specifically, a transmitter laser source transmits a transmitted laser signal for use in observing one or more objects 40 and one or more receiver laser sources are provided, one per receiver on the one or more receivers 42. Each of the receiver laser sources transmits a reference beam in order to create an interference or heterodyne signal 44. The one or more detectors, one per receiver on the one or more receivers, detects the transmitted laser signal and the interference between the transmitted laser signal and the reference beam for use in observing the one or more objects 46. The transmitter laser source and the one or more receivers are located a distance apart from each other thereby forming a bistatic or multi-static system 48. Coherence for each laser is maintained via a control system, such that the transmitter laser and each receiver laser locks at the same frequency reference 50.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A multi-static or bistatic LIDAR system, comprising:
    a transmitter, wherein the transmitter comprises:
        a transmitter laser source for transmitting a transmitted laser signal for use in observing one or more objects;
        a transmitter beam splitter; and
        a first atomic reference lock having an absolute frequency reference, wherein the transmitter beam splitter redirects a portion of the transmitted laser signal to the first atomic reference lock, and wherein the first atomic reference lock is configured to send a first error signal to the transmitter laser source when a frequency of the portion of the transmitted laser signal to the first atomic reference lock is different than the absolute frequency reference;
    one or more receivers, wherein the one or more receivers comprise:
        one or more receiver laser sources one per receiver on the one or more receivers, where the one or more receiver laser sources provide a reference beam in order to create an interference or heterodyne signal;
        a first receiver beam splitter;
        a second atomic reference lock having the absolute frequency reference, wherein the first receiver beam splitter redirects a portion of the reference beam to the second atomic reference lock, and wherein the second atomic reference lock is configured to send a second error signal to the one or more receiver laser sources when a frequency of the portion of the reference beam to the second atomic reference lock is different than the absolute frequency reference such that the transmitted laser signal reflected off an object and the reference beam lock to a substantially same absolute frequency and maintain independent coherence between each other and the first atomic reference lock and the second atomic reference lock are at a substantially same atomic absorption line; and one or more detectors one per receiver on the one or more receivers being configured to detect the transmitted laser signal reflected off the object and the interference between the transmitted laser signal and the reference beam for use in observing the one or more objects, wherein the transmitter laser source and the one or more receivers are located a distance apart from each other thereby forming a bistatic or multi-static system.

2. The multi-static or bistatic LIDAR system according to claim 1, further comprising a temperature stabilized cavity locking the transmitted laser signal and the reference beam.

3. The multi-static or bistatic LIDAR system according to claim 1, wherein the absolute frequency reference is that of the Rb transition at 780 nm.

4. The multi-static or bistatic LIDAR system according to claim 1, further comprising a bandpass filter configured to filter the transmitted laser signal.

5. The multi-static or bistatic LIDAR system according to claim 1, further comprising a transmitter mirror wherein the portion of the transmitted laser signal to the first atomic reference lock is reflected by the transmitter mirror.

6. The multi-static or bistatic LIDAR system according to claim 1, further comprising a first receiver mirror wherein the portion of the reference beam to the second atomic reference lock is reflected by the first receiver mirror.

7. The multi-static or bistatic LIDAR system according to claim 1, further comprising a second receiver beam splitter wherein the transmitted laser signal reflected off the object is combined with the reference beam by the second receiver beam splitter.

8. The multi-static or bistatic LIDAR system according to claim 7, further comprising a second receiver mirror wherein the reference beam is reflected to the second receiver beam splitter by the second receiver mirror.

9. A method of reference locking a multi-static or bistatic coherent LIDAR system, comprising:

transmitting, via a transmitter laser source, a transmitted laser signal for use in observing one or more objects;

providing one or more receiver laser sources one per receiver on one or more receivers, transmitting, via each of the one or more receiver laser sources, a reference beam in order to create an interference or heterodyne signal;

detecting, via one or more detectors one per receiver on the one or more receivers wherein the detectors are configured to detect the transmitted laser signal and the interference between the transmitted laser signal and the reference beam for use in observing the one or more objects, and wherein the transmitter laser source and the one or more receivers are located a distance apart from each other thereby forming a bistatic or multi-static system; and maintaining coherence for the transmitter laser source and the one or more receiver laser sources, via a control system, such that the transmitter laser source and each of the one or more receiver laser sources locks at a substantially same frequency reference, wherein the control system comprises redirecting a portion of the transmitted laser signal to a first atomic reference lock having an absolute frequency reference and redirecting a portion of the reference beam to a second atomic reference lock having the absolute frequency reference such that the transmitted laser signal and the reference beam lock to the substantially same frequency reference and maintain coherence between each other independent of each other and the first atomic reference lock and the second atomic reference lock are at a substantially same atomic absorption line.

* * * * *